United States Patent
Muras

(10) Patent No.: US 7,337,167 B2
(45) Date of Patent: Feb. 26, 2008

(54) ESTIMATING A NUMBER OF ROWS RETURNED BY A RECURSIVE QUERY

(75) Inventor: Brian Robert Muras, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 397 days.

(21) Appl. No.: 11/106,009

(22) Filed: Apr. 14, 2005

(65) Prior Publication Data

US 2006/0235818 A1    Oct. 19, 2006

(51) Int. Cl.
G06F 17/30    (2006.01)
(52) U.S. Cl. .................... 707/3; 707/4; 707/2
(58) Field of Classification Search .............. 707/2, 707/3, 4
See application file for complete search history.

(56) References Cited

U.S. PATENT DOCUMENTS

| | | | | |
|---|---|---|---|---|
| 5,546,570 | A * | 8/1996 | McPherson et al. | 707/4 |
| 5,546,571 | A * | 8/1996 | Shan et al. | 707/3 |
| 6,341,277 | B1 * | 1/2002 | Coden et al. | 707/2 |
| 7,213,012 | B2 * | 5/2007 | Jakobsson et al. | 707/2 |
| 2004/0225639 | A1 * | 11/2004 | Jakobsson et al. | 707/2 |
| 2005/0120000 | A1 * | 6/2005 | Ziauddin et al. | 707/3 |

* cited by examiner

Primary Examiner—Don Wong
Assistant Examiner—Thanh-Ha Dang
(74) Attorney, Agent, or Firm—Owen J. Gamon

(57) ABSTRACT

A method, apparatus, system, and signal-bearing medium that, in an embodiment, estimate a number of rows that a recursive query will retrieve from a table by recursively probing an index associated with the table. A recursive query includes a seed and a recursive predicate, each of which is associated with a respective column in the table. If the index has a leading column that matches the table column associated with the seed, and the index has a secondary column that matches the table column associated with the recursive predicate, then the index is recursively probed until a threshold depth of the recursive probing is reached or until all nodes of the index have been examined. The estimated number of rows that the recursive query will retrieve is then calculated based on either the number of rows examined in the index (if the threshold depth has not been reached) or based on the threshold depth, a cardinality of the secondary column, and a cardinality of the primary column (if the threshold depth has been reached). If the index does not have a leading column that matches the table column associated with the seed, an index is found that has a recursive and non-recursive columns that match columns that are compared by the recursive predicate. The minimum value of the leading column is then used to start recursively probing up the index, and the estimated number of rows is calculated based on the maximum depth (or average depth in another embodiment) of the recursion, a cardinality of the recursive column, and a cardinality of the non-recursive column.

5 Claims, 5 Drawing Sheets

US 7,337,167 B2

ESTIMATING A NUMBER OF ROWS RETURNED BY A RECURSIVE QUERY

FIELD

This invention generally relates to computer database management systems and more specifically relates to estimating rows returned by recursive queries.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs.

Fundamentally, computer systems are used for the storage, manipulation, and analysis of data, which may be anything from complicated financial information to simple baking recipes. It is no surprise, then, that the overall value or worth of a computer system depends largely upon how well the computer system stores, manipulates, and analyzes data. One mechanism for managing data is called a database management system (DBMS), which may also be called a database system or simply a database.

Many different types of databases are known, but the most common is usually called a relational database (RDB), which organizes data in tables that have rows, which represent individual entries or records in the database, and columns, which define what is stored in each entry or record. Each table has a unique name within the database and each column has a unique name within the particular table. The database also has an index, which is a data structure that informs the database management system of the location of a certain row in a table given an indexed column value, analogous to a book index informing the reader on which page a given word appears.

To be useful, the data stored in databases must be capable of being retrieved in an efficient manner. The most common way to retrieve data from a database is through statements called database queries, which may originate from user interfaces, application programs, or remote systems, such as clients or peers. A query is an expression evaluated by the database management system. As one might imagine, queries range from being very simple to very complex. Although the query requires the return of a particular data set in response, the method of query execution is typically not specified by the query. Thus, after the database management system receives a query, the database management system interprets the query and determines what internal steps are necessary to satisfy the query. These internal steps may include an identification of the table or tables specified in the query, the row or rows selected in the query, and other information such as whether to use an existing index, whether to build a temporary index, whether to use a temporary file to execute a sort, and/or the order in which the tables are to be joined together to satisfy the query.

When taken together, these internal steps are referred to as an execution plan, an access plan, or just a plan. The access plan is typically created by a software component of the database management system that is often called a query optimizer. The query optimizer may be part of the database management system or separate from, but in communication with, the database management system. When a query optimizer creates an access plan for a given query, the access plan is often saved by the database management system in the program object, e.g., the application program, that requested the query. The access plan may also be saved in an SQL (Structured Query Language) package or an access plan cache. Then, when the user or program object repeats the query, which is a common occurrence, the database management system can find and reutilize the associated saved access plan instead of undergoing the expensive and time-consuming process of recreating the access plan. Thus, reusing access plans increases the performance of queries when performed by the database management system.

Many different access plans may be created for any one query, each of which returns the required data set, yet the different access plans may provide widely different performance. Thus, especially for large databases, the access plan selected by the database management system needs to provide the required data at a reasonable cost in terms of time and hardware resources. Hence, the query optimizer often creates multiple prospective access plans and then chooses the best, or least expensive one, to execute.

One factor that contributes to the cost of a particular access plan is the number of rows that a query using that access plan returns from a database table. A query that returns a large number of rows may run most efficiently with one access plan, while a query that returns only a small number of rows may run most efficiently with a different access plan. Hence, in an attempt to choose the best access plan for a particular query, current query optimizers estimate the number of rows that the query will return when executed based on the number of unique values in a column of the table to which the query is directed. This number of unique values is called the cardinality of the column.

While using the cardinality of a column as an estimate for the number of rows returned by a query may work well for conventional queries, it does not work well for recursive queries. A recursive query returns rows that have relationships to an arbitrary depth in a table and provides an easier way of traversing tables that represent tree or graph data structures. For example, given a table that represents the reporting relationships within a company, a recursive query may return all employees that report, directly or indirectly, to one particular person. Recursive queries typically contain an initial sub-query, a seed, and a recursive sub-query that, during each iteration, appends additional rows to the result set. An example of a recursive query is the SQL (structured query language) recursive common table expression (RCTE). Unfortunately, the cardinality function merely calculates the number of unique values in a column and ignores the recursive nature of the query and the relationships of the data within the column. Thus, using merely the cardinality of a column as an estimate for the number of rows returned by a query does not work well for recursive queries. Hence, conventional query optimizers experience difficulty choosing the most efficient access path for recursive queries.

Thus, there is a need for a technique configured to estimate the number of rows returned by a recursive query in a database environment.

SUMMARY

A method, apparatus, system, and signal-bearing medium are provided that, in an embodiment, estimate a number of rows that a recursive query will retrieve from a table by recursively probing an index associated with the table. A recursive query includes a seed and a recursive predicate, each of which is associated with a respective column in the table.

If the index has a leading column that matches the table column associated with the seed, and the index has a secondary column that matches the table column associated with the recursive predicate, then the index is recursively probed until a threshold depth of the recursive probing is reached or until all nodes of the index have been examined. The estimated number of rows that the recursive query will retrieve is then calculated based on either the number of rows examined in the index (if the threshold depth has not been reached) or based on the threshold depth, a cardinality of the secondary column, and a cardinality of the primary column (if the threshold depth has been reached). In an embodiment, the estimated number of rows may further be calculated based on the number of rows in the table and a cardinality of the leading column of the index and the secondary column of the index taken together.

If the index does not have a leading column that matches the table column associated with the seed, an index is found that has a recursive column and a non-recursive column that match columns that are compared by the recursive predicate. The minimum value of the leading column is then used to start recursively probing up the index, and the estimated number of rows is calculated based on the maximum depth (or average depth in another embodiment) of the recursion, a cardinality of the recursive column, and a cardinality of the non-recursive column. In an embodiment, the estimated number of rows may further be calculated based on the number of rows in the table and a cardinality of the recursive column of the index and the non-recursive column of the index taken together.

BRIEF DESCRIPTION OF THE DRAWINGS

Various embodiments of the present invention are hereinafter described in conjunction with the appended drawings.

It is to be noted, however, that the appended drawings illustrate only example embodiments of the invention, and are therefore not considered limiting of its scope, for the invention may admit to other equally effective embodiments.

DETAILED DESCRIPTION

Figure 1:
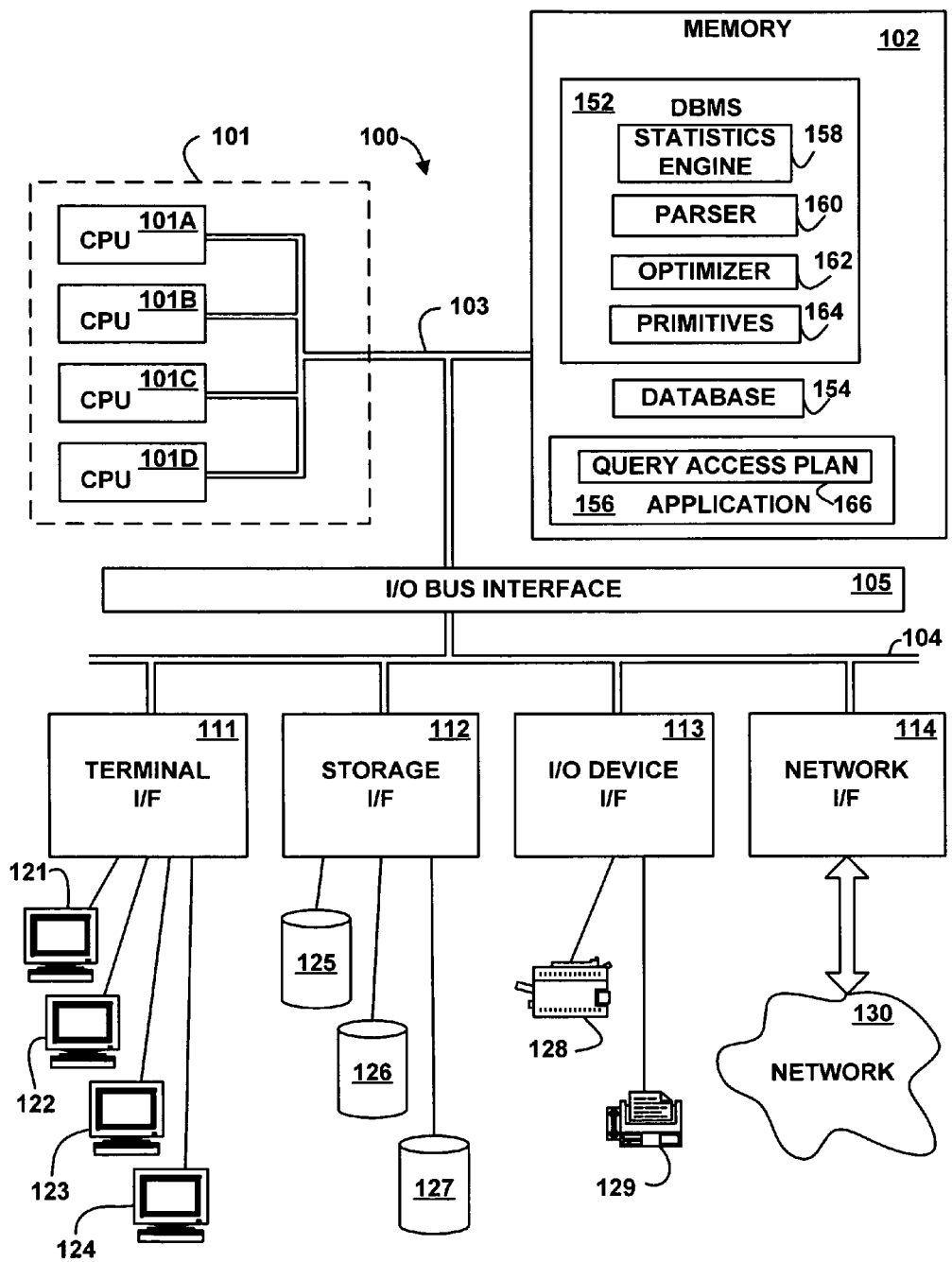
FIG. 1 depicts a high-level block diagram of an example system for implementing an embodiment of the invention.

Referring to the Drawings, wherein like numbers denote like parts throughout the several views, FIG. 1 depicts a high-level block diagram representation of a computer system 100 connected to a network 130, according to an embodiment of the present invention. In an embodiment, the hardware components of the computer system 100 may be implemented by an eServer iSeries computer system available from International Business Machines of Armonk, N.Y. However, those skilled in the art will appreciate that the mechanisms and apparatus of embodiments of the present invention apply equally to any appropriate computing system.

The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 includes a database management system 152, a database 154, and an application 156. Although the database management system 152, the database 154, and the application 156 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the database management system 152, the database 154, and the application 156 are illustrated as being contained within the main memory 102, these elements are not necessarily all completely contained in the same storage device at the same time. Further, although the database management system 152, the database 154, and the application 156 are illustrated as being separate entities, in other embodiments some of them, or portions of some of them, may be packaged together.

The database management system 152 includes a statistics engine 158, a parser 160, a query optimizer 162, and primitives 164. The parser 160, the query optimizer 162, and the primitives 164 may be implemented using the DB2 (Database 2) product available from International Business Machines of Armonk, N.Y., but in other embodiments any appropriate parser, query optimizer, and primitives may be used. The database 154 includes data, e.g., organized in rows and columns, and indexes used to access the data. The application 156 includes a query access plan 166. In another embodiment, the query access plan 166 may be separate from the application 156, including being part of or managed by the database management system 152.

The application 156 sends a query to the database management system 152. In an embodiment, a query includes a combination of SQL (Structured Query Language) commands intended to produce one or more output data tables according to a specification included in the query, but in other embodiments any appropriate query language may be used.

The parser 160 verifies the syntax of the received query and parses the received query to produce a query tree or other parsed code. The query optimizer 162 accepts the query tree or parsed code as input and, in response, creates the query access plan 166, which in an embodiment may be reused during subsequent executions of the query. The query optimizer 162 may determine the least expensive, or most efficient, way to execute the query. To this end, the query optimizer 162 may generate multiple possible access plans and choose the best one. In doing so, the query optimizer 162 may compare the costs of competing plans, and the costs may include estimated resource requirements determined in terms of time and space. More specifically, the resource requirements may include system information, such as the location of tables and parts of tables in the database 154, the size of such tables, network node locations, system operating characteristics and statistics, estimated runtime for the query, memory usage, and the estimated number of rows returned by the query, among others. The query optimizer 162 invokes, calls, or sends requests to the statistics engine 158 to estimate the number of rows returned by the query. Although the statistics engine 158 is illustrated as being separate from the query optimizer 162, in another embodiment, the statistics engine 158 may be packaged with the query optimizer 162. In fact, the statistics engine 158, the parser 160, the query optimizer 162, and the primitives 164 may be packaged together or separately in any combination.

The primitives 164 execute the query against the database 154 using the query access plan 166. The query access plan 166 includes low-level information indicating the steps that the primitives 164 are to take to execute the query against the database 154. The query access plan 166 may include, in various embodiments, an identification of the table or tables in the database 154 specified in the query, the row or rows selected in the query, and other information such as whether to use an existing index, whether to build a temporary index, whether to use a temporary file to execute a sort, and/or the order in which the tables are to be joined together to satisfy the query.

The statistics engine 158 processes the query received from the application 156 and interrogates tables, column statistics, and indexes in the database 154 to estimate a number of rows that will be returned by the query when executed against the database 154 by the primitives 164. The functions of the statistics engine 158 are further described below with reference to FIGS. 4 and 5. Examples of the database 154 are further described below with reference to FIGS. 2 and 3.

In an embodiment, the statistics engine 158 includes instructions capable of executing on the processor 101 or statements capable of being interpreted by instructions executing on the processor 101 to perform the functions as further described below with reference to FIGS. 4 and 5. In another embodiment, the statistics engine 158 may be implemented in microcode. In another embodiment, the statistics engine 158 may be implemented in hardware via logic gates and/or other appropriate hardware techniques.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI bus, or any other appropriate bus technology.

The I/O interface units support communication with a variety of storage and I/O devices. For example, the terminal interface unit 111 supports the attachment of one or more user terminals 121, 122, 123, and 124. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127, as needed.

The I/O and other device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types. The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol).

In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number (including zero) of networks (of the same or different types) may be present.

It should be understood that FIG. 1 is intended to depict the representative major components of the computer system 100 and the network 130 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements comprising the various aspects of an embodiment of the invention.

Moreover, while embodiments of the invention have and hereinafter will be described in the context of fully-functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of signal-bearing media, which include, but are not limited to:

(1) information permanently stored on a non-rewriteable storage medium, e.g., a read-only memory device attached to or within a computer system, such as a CD-ROM, DVD-R, or DVD+R;

(2) alterable information stored on a rewriteable storage medium, e.g., a hard disk drive (e.g., the DASD 125, 126, or 127), CD-RW, DVD-RW, DVD+RW, DVD-RAM, or diskette; or (3) information conveyed by a communications medium, such as through a computer or a telephone network, e.g., the network 130, including wireless communications.

Such signal-bearing media, when carrying machine-readable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
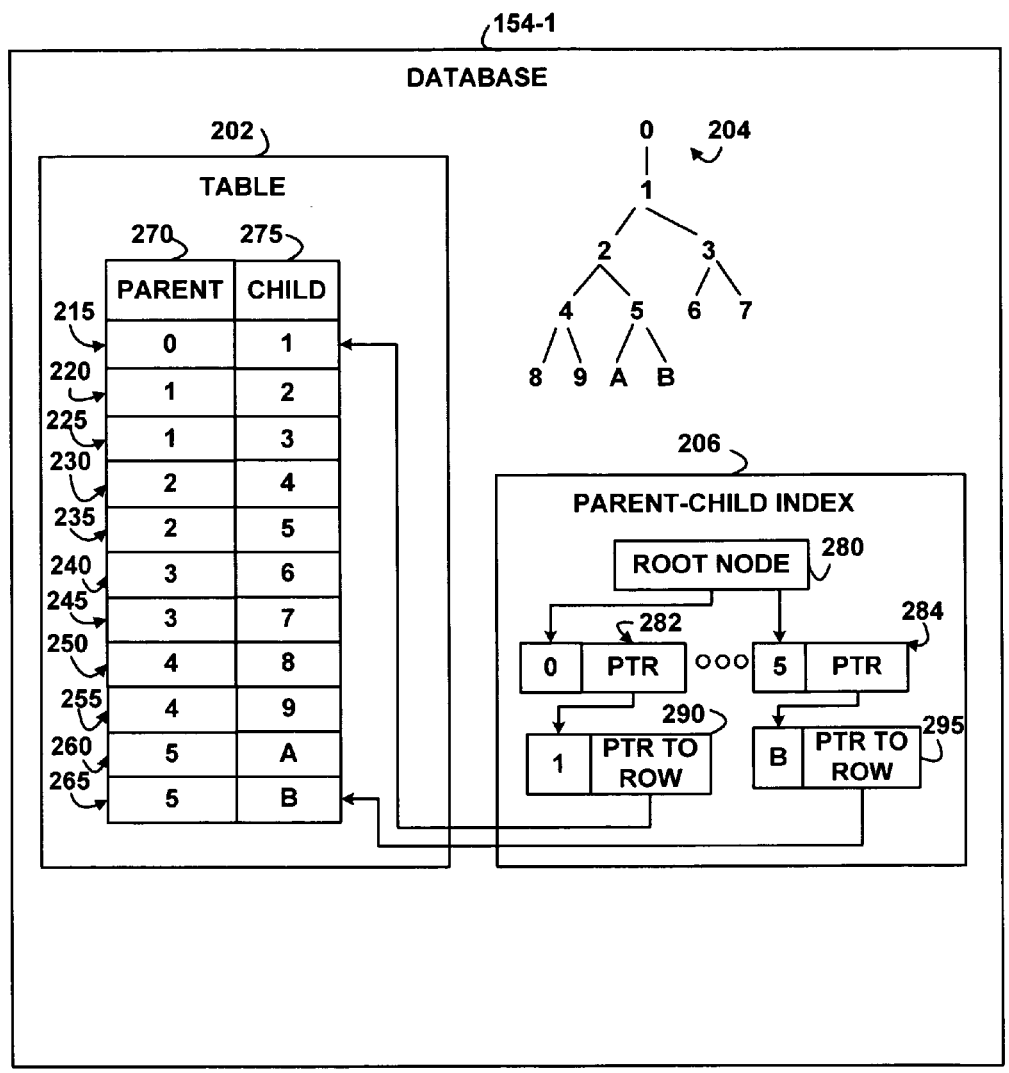
FIG. 2 depicts a block diagram of an example database, according to an embodiment of the invention.

FIG. 2 depicts a block diagram of an example database 154-1, which is an instance of the database 154 (FIG. 1), according to an embodiment of the invention.

The example database 154-1 includes a table 202 and a parent-child index 206. Although only one table 202 and one index 206 are illustrated in FIG. 2, in other embodiments any number of tables and any number of indexes may be present. The table 202 includes rows 215, 220, 225, 230, 235, 240, 245, 250, 255, 260, and 265 but, in other embodiments any number of rows with any appropriate data may be present. The table 202 further includes columns 270 and 275, but in other embodiments any number of columns may be present. In this example, the column 270 represents a parent key and the column 275 represents a child key, but in other embodiments other keys such as manager and employee, directory and sub-directory, country and state, or any other appropriate keys may be used.

The tree 204 graphically illustrates the relationship of the data within the table 202. Thus, "0" is the parent of "1," as illustrated in row 215; "1" is the parent of "2" and "3," as illustrated in rows 220 and 225; "2" is the parent of "4" and "5," as illustrated in rows 230 and 235; "4" is the parent of "8" and "9," as illustrated in rows 250 and 255; "5" is the parent of "A" and "B", as illustrated in rows 260 and 265; and "3" is the parent of "6" and "7," as illustrated in rows 240 and 245.

The parent-child index 206 is a data structure that provides access to the table 202. In the parent-child index 206, the parent key is the leading column and the child key is the secondary column. Thus, using the parent key, the child can be found. The parent-child index 206 includes a root node 280, which points to nodes representing all parents in the table 202, such as the example node 282, representing the parent "0" and the example node 284, representing the parent "5." Each of the parent nodes, in turn, points to its child nodes, such as the nodes 290 and 295. The nodes 290 and 295 then include pointers to the appropriate row in the table 202, which the combination of the parent nodes in the index 206 and the child node in the index 206 represents. Thus, the combination of the nodes 282 and 290 represents row 215, so the node 290 includes a pointer to row 215. Further, the combination of the nodes 284 and 295 represents row 265, so the node 295 includes a pointer to the row 265. In this way, the index 206 provides a way to find the row in the table 202 associated with a particular parent 270 and child 275 that is faster than searching the table 202 from beginning to end. Finding a particular child (secondary column) given a parent (leading column) using the index 206 is referred to as probing the index.

Figure 3:
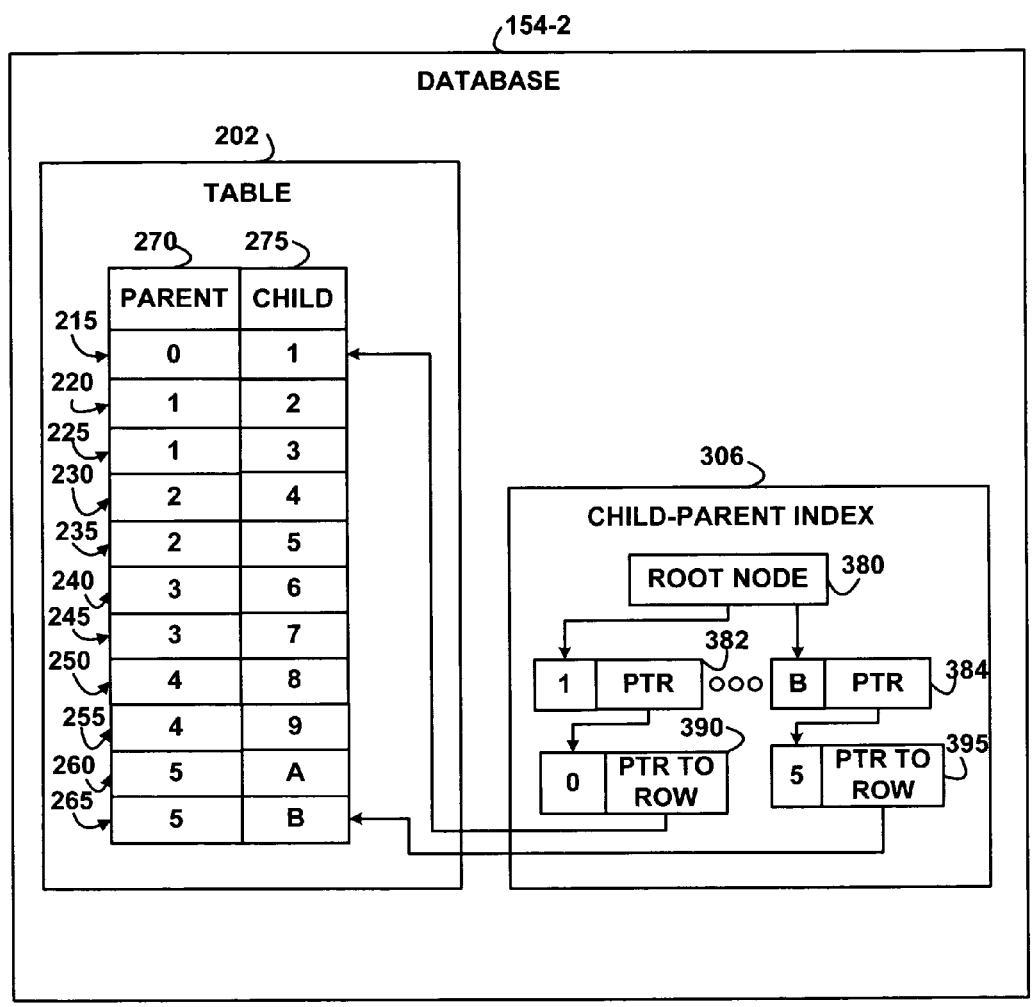
FIG. 3 depicts a block diagram of another example database, according to an embodiment of the invention.

FIG. 3 depicts a block diagram of another example database 154-2, which is an instance of the database 154 (FIG. 1), according to an embodiment of the invention. The example database 154-2 includes the same table 202 as previously described above with reference to FIG. 2, but a different index, the child-parent index 306.

The child-parent index 306 is a data structure that allows access to the table 202. In the child-parent 306, the child key is the leading column and the parent key is the secondary column (the opposite of the parent-child index 206 in FIG. 2). Thus, using the child key, the parent can be found using the child-parent index 306. The child-parent index 306 includes a root node 380, which points to nodes representing all children in the table 202, such as the example nodes 382, representing the child "1" and 384, representing the child "B." Each of the child nodes, in turn, points to its parent nodes, such as the nodes 390 and 395. The nodes 390 and 395 then include pointers to the appropriate row in the table 202, which the combination of the nodes in the child-parent index 306 represents. Thus, the combination of the nodes 382 and 390 represents row 215, so the node 390 includes a pointer to row 215. Further, the combination of the nodes 384 and 395 represents row 265, so the node 395 includes a pointer to the row 265. Thus, the child-parent index 306 provides a way to find the row in the table 202 associated with a particular child 275 and parent 270 that is faster than searching the table 202 from beginning to end. Finding a particular parent (secondary column) given a child (leading column) using the index is referred to as probing the index.

Figure 4:
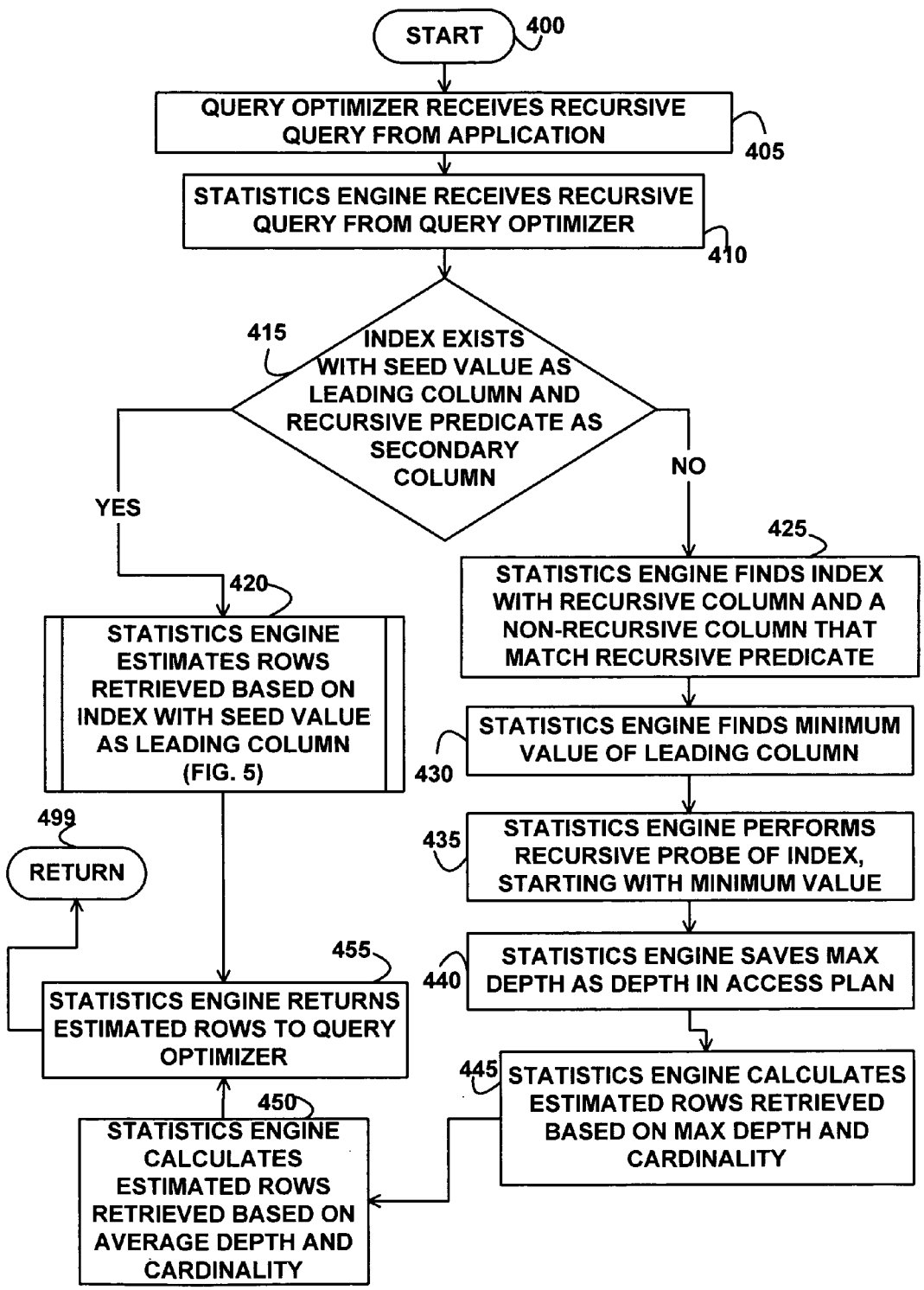
FIG. 4 depicts a flowchart of example processing for processing a recursive query, according to an embodiment of the invention.

FIG. 4 depicts a flowchart of example processing for processing a recursive query, according to an embodiment of the invention. Control begins at block 400. Control then continues to block 405 where the query optimizer 162 receives a recursive query from the application 156. Control then continues to block 410 where the statistics engine 158 receives the recursive query from the query optimizer 162 with a request to estimate the number of rows in the database 154 that the recursive query will return when executed by the primitives 164.

Consider the following example recursive query, which uses the recursive common table expression (RCTE) of SQL (Structured Query Language):

with rcte as (select X.parent_id, X.child_id from X where X.parent_id=0//seed union all select Y.parent, Y.child from X as Y, rcte as Z where Y.parent=Z.child)//recursive predicate select*from rcte "Parent_id=0" is the seed value of the above example recursive query, and "Y.parent=Z.child" is the recursive predicate. In other embodiments, any appropriate query language or interface may be used.

Using the example of FIG. 2, the parent column 270 of the table 202 is the column in the parent-child index 206 associated with the seed of the example query, and the child column 275 of the table 202 is the column in the parent-child index 206 that is associated with the recursive predicate of the example query. Further, the parent column 270 in the table 202 is the leading column in the parent-child index 206, and the child column 275 is the secondary column in the parent-child index 206. Thus, the parent-child index 206 has the seed of the example recursive query as the leading column in the index. The leading column of an index is the primary key, meaning it is sorted first in the index.

In FIG. 3, the parent column 270 of the table 202 is the column in the child-parent index 306 associated with the seed of the example query, and the child column 275 of the table 202 is the column in the child-parent index 306 that is associated with the recursive predicate of the example query. Further, the parent column 270 in the table 202 is the secondary column in the child-parent index 306, and the child column 275 is the leading column in the child-parent index 306. Thus, the child-parent index 306 has the seed of the example recursive query as the secondary column in the index, so the seed of the recursive predicate of the example query is not associated with the leading column of the child-parent index 306.

Control then continues to block 415 where the statistics engine 158 determines whether an index exists in the database 154 with the seed of the recursive query as the leading column in the index and the recursive predicate of the recursive query as a secondary column in the index. If the determination at block 415 is true (as in the example FIG. 2), then control continues to block 420 where the statistics engine 158 estimates the number of rows that the recursive query will retrieve when executed based on the index with the seed value as the leading column, as further described below with reference to FIG. 5. Control then continues to block 455 where the statistics engine 158 returns the estimated number of rows to the query optimizer 162, which uses the estimated number of rows to choose a query access plan 166. Control then continues to block 499 where the logic of FIG. 4 returns.

If the determination of block 415 is false (as in the example FIG. 3), then control continues to block 425 where the statistics engine 158 finds an index in the database 154 with a recursive column and a non-recursive column, where the recursive column matches a first column in the recursive predicate, the non-recursive column matches a second column in the recursive predicate, and the recursive predicate compares the first column to the second column. The use of the labels "first column" and "second column" is for convenience only and does not imply an order. The example child-parent index 306 of FIG. 3 is such an index. But, the secondary column that matches the seed may be any appropriate column in the index and is not restricted to a column that has a parent/child relationship. Consider the following example SQL statement:

with R as (ToFlight, FromFlight) select X.ToFlight, X.FromFlight from FlightTable as X where price <200 union all select Y.ToFlight, Y.FromFlight from FlightTable as Y, R where Y.FromFlight=R.ToFlight)

select*from R.

A parent child relationship in the above example SQL statement may be (FromFlight, ToFlight) or (ToFlight, FromFlight) while the seed is price, a column unrelated to FromFlight or ToFlight. In this example, R.toFlight is the recursive column of the recursive predicate and Y.FromFlight is the non-recursive column of the recursive predicate.

Control then continues to block 430 where the statistics engine 158 finds the minimum value of the leading column of the index. For example, "1" in row 215 of the table 202 is the minimum value of the leading column (the child column 275) of the index 306. Control then continues to block 435 where the statistics engine 158 performs a recursive probe of the index to find the maximum depth of the recursion, starting with the minimum value of the leading column. The index is probed up the tree or graph of the table until the root is encountered, then the next smallest child value not already processed is used as the new seed. The depth is the number of probes (accesses) of the index that is required in order to find a particular row or record in the table. Recursive probing is accomplished by using the parent returned by each probe as the child of the following probe. The maximum depth is thus the maximum number for all of the rows of the table.

Control then continues to block 440 where the statistics engine 158 saves the maximum depth of the recursion, as found by the recursive probe, in the query access plan 166. Control then continues to block 445 were the statistics engine 158 calculates the estimated number of rows that the recursive query will retrieve. If the leading column of the index and the secondary column of the index taken together are unique for every value (as is the case in FIG. 2), then the estimated number of rows is calculated by multiplying the maximum depth of the recursion times the maximum[cardinality(recursive column), cardinality(non-recursive column)]/minimum[cardinality(recursive column), cardinality (non-recursive column)]. (If the recursive column and the non-recursive column are unique for every value, then the number of rows is equal to the cardinality of the recursive column and the non-recursive column taken together.)

If the recursive column of the index and the non-recursive column of the index taken together are not unique for every value in the index, then the estimated number of rows is calculated by multiplying the maximum depth of the recursion by maximum[cardinality(recursive column), cardinality (non-recursive column)]/minimum[cardinality(recursive column), cardinality(non-recursive column)] multiplied by the number of rows in the table divided by the cardinality of the recursive column and the non-recursive column taken together.

Control then continues to block 450 where the statistics engine 158 calculates the estimated number of rows that the recursive query will retrieve by multiplying the average depth of the recursion by maximum[cardinality(recursive column), cardinality(non-recursive column)]/minimum[cardinality(recursive column), cardinality(non-recursive column)], where the average depth is the average of all depths needed to find all records or rows in the table by recursively probing the index. This result is further multiplied by the number of rows in the table divided by the cardinality of the recursive column and the non-recursive column taken together if the recursive column and the non-recursive column are not unique for every value in the index. The maximum depth used by the calculation of block 445 and the average depth used by the calculation of block 450 may be alternative embodiments for calculating the estimated number of rows returned by the recursive query when executed. Control then continues to block 455, as previously described above.

Figure 5:
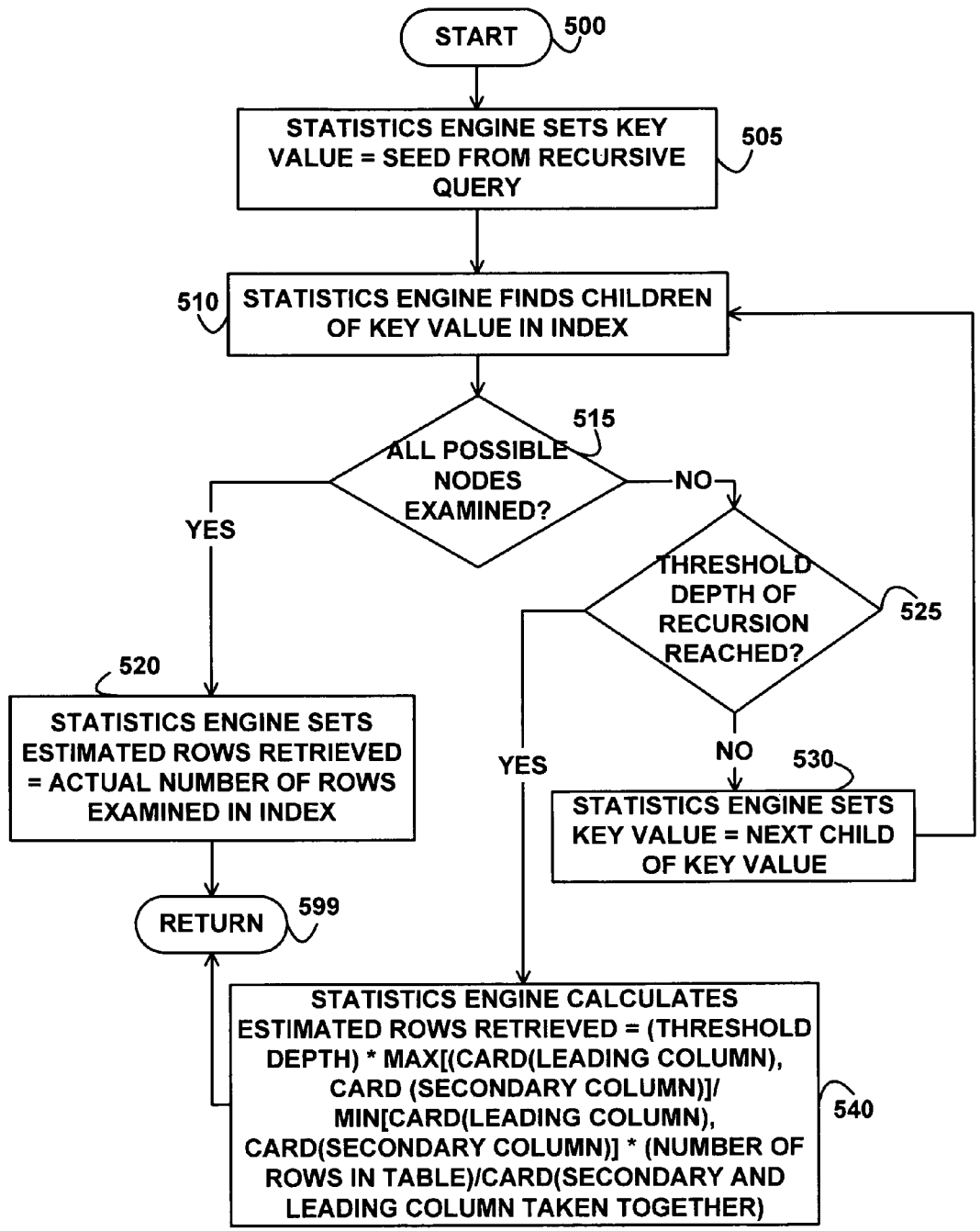
FIG. 5 depicts a flowchart of further example processing for processing a recursive query, according to an embodiment of the invention.

FIG. 5 depicts a flowchart of further example processing for processing a recursive query when an index exists with the seed value of the query as the leading column in the index, according to an embodiment of the invention. Control begins at block 500. Control then continues to block 505 where the statistics engine 158 sets the key value to use in the probe of the index to be the seed value from the recursive query. Control then continues to block 510 where the statistics engine 158 probes the index to find all children of the key value in the index. Control then continues to block 515 where the statistics engine 158 determines whether all possible nodes in the index have been examined by the recursive probe.

If the determination at block 515 is true, then all possible nodes in the index have been examined, so control continues to block 520 where the statistics engine 158 sets the estimated number of rows to be the actual number of rows examined in the index by the recursive probe. Control then continues to block 599 where the logic of FIG. 5 returns.

If the determination at block 515 is false, then all possible nodes in the index have not been examined, so control continues to block 525 where the statistics engine 158 determines whether a threshold depth of the recursion has been reached by the probe. If the determination at block 525 is true, then control continues to block 540 where the statistics engine 158 calculates the estimated number of rows to be the threshold depth of the recursion multiplied by maximum[cardinality(leading column), cardinality(secondary column)]/minimum[cardinality(leading column), cardinality(secondary column)]. This result is further multiplied by the number of rows in the table divided by the cardinality of the leading column and the secondary column taken together if the leading column and the secondary column are not unique for every value in the index. Control then continues to block 599 where the logic of FIG. 5 returns.

If the determination at block 525 is false, then the threshold depth of the recursion has not been reached by the probe, so control continues to block 530 where the statistics engine 158 sets the key value to be the next child of the current key value. Control then returns to block 510 where the statistics engine recursively probes children of the new key value, as previously described above. Thus, recursion probing of the index is performed by using the child returned by one probe of the index as the parent of a subsequent probe.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

What is claimed is:

1. A storage medium encoded with instructions, wherein the instructions when executed comprise:

receiving a recursive query from a query optimizer, wherein the recursive query comprises a recursive predicate associated with a recursive column in a table;

estimating a number of rows that the recursive query will retrieve, wherein the estimating further comprises recursively probing an index associated with the table, wherein the recursive predicate comprises a comparison of a first column and a second column, wherein the estimating further comprises determining that the recursive column of the index is associated with the first column of the recursive predicate and a non-recursive column of the index is associated with the second column of the recursive predicate, and wherein the estimating further comprises calculating the number of rows that the recursive query will retrieve based on a maximum depth of the recursive probing, a cardinality of a leading column of the index, a cardinality of a secondary column of the index, a number of rows in the table, and a cardinality of the leading column of the index and the secondary column of the index taken together; and returning the number of rows to the query optimizer.

2. The storage medium of claim 1, wherein the recursive query comprises a seed associated with a seed column in the table and wherein the estimating further comprises:

determining that the seed column of the table is associated with the leading column of the index; and determining that the recursive column of the table is associated with the secondary column of the index.

3. The storage medium of claim 2, wherein the estimating further comprises:

recursively probing the index until a threshold depth of the recursive probing is reached.

4. The storage medium of claim 2, wherein the estimating further comprises:

recursively probing the index until all nodes of the index have been examined by the recursive probing, so long as a threshold depth of the recursive probing is not reached.

5. The storage medium of claim 1, wherein the estimating further comprises:

finding a minimum value of the leading column of the index; and recursively probing the index starting with the minimum value.

* * * * *